United States Patent

Kretschmer et al.

Patent Number: 5,538,474
Date of Patent: Jul. 23, 1996

[54] DRIVESHAFT LENGTH ADJUSTING MECHANISM WITH TWO PROFILES

[75] Inventors: Horst Kretschmer, Köln; Hans-Jürgen Langen, Frechen; Paul Herchenbach, Ruppichteroth; Clemens Nienhaus; Hubert Grosse-Entrup, both of Lohmar, all of Germany

[73] Assignee: GKN Walterscheid GmbH, Lohmar, Germany

[21] Appl. No.: 306,701

[22] Filed: Sep. 15, 1994

[30] Foreign Application Priority Data

Sep. 16, 1993 [DE] Germany ............ 43 31 484.8
Aug. 4, 1994 [DE] Germany ............ 44 27 532.3

[51] Int. Cl.$^6$ ................ F16C 3/03; F16D 3/06
[52] U.S. Cl. ........................................ 464/162
[58] Field of Search ................ 464/162, 183; 403/109

[56] References Cited

U.S. PATENT DOCUMENTS

| | | | |
|---|---|---|---|
| 1,943,980 | 1/1934 | Mall | 464/183 X |
| 3,805,552 | 4/1974 | Heald. | |
| 4,076,437 | 2/1978 | Mazzolla | 403/109 X |
| 4,238,164 | 12/1980 | Mazzolla | 403/109 |
| 4,622,022 | 11/1986 | Diffenderfer et al. . | |

FOREIGN PATENT DOCUMENTS

| | | |
|---|---|---|
| 2320459 | 3/1977 | France . |
| 2508860 | 1/1983 | France . |
| 1820090U1 | 11/1958 | Germany . |
| 7007851U1 | 3/1970 | Germany . |
| 2635120A1 | 2/1977 | Germany . |
| 2635120C2 | 12/1981 | Germany . |
| 3241715A1 | 5/1984 | Germany . |
| 3223004C2 | 11/1992 | Germany . |

*Primary Examiner*—Daniel P. Stodola
*Assistant Examiner*—Emmanuel M. Marcelo
*Attorney, Agent, or Firm*—Harness, Dickey & Pierce

[57] ABSTRACT

A length adjusting mechanism for a driveshaft has two tubular profiles, an outer profile (6) and an inner profile (7). The outer profile (6) includes two circumferentially offset drawn in wedges (8) which project inwardly beyond the inner face of the otherwise circular cross-section of the outer profile (6). The wedges (8) engage grooves (11) of an inner profile (7). The grooves (11) are also drawn in. In this way it is possible to produce a pair of profiles which are suitable to transmit high torques and which, furthermore, do not include any parts which project in a radially outward direction.

7 Claims, 2 Drawing Sheets

DRIVESHAFT LENGTH ADJUSTING MECHANISM WITH TWO PROFILES

BACKGROUND OF THE INVENTION

Driveshaft length adjusting devices, especially driveshafts with universal joints in the driveline of or for driving agricultural implements, have at least two tube shaped profiles inserted into one another. An outer profile and an inner profile are axially movable relative to one another along their longitudinal axis and serve to transmit torque. The walls of the outer profile and inner profile, if viewed in cross-section, are partly designed as circular portions. Each wall includes at least one projection which extends parallel to the longitudinal axis. The projection of the inner profile is formed in the form of a drawn-in portion directed inwardly towards the longitudinal axis. The projection of the outer profile forms a wedge and the projection of the inner profile forms a groove which permits engagement of the wedge. The flanks of the wedge and the groove are inclined in such a way that their imaginary extensions intersect a central plane. The plane extends centrally between the flanks and contains the longitudinal axis. A central axis, formed at the intersection of the imaginary planes, is offset from, and parallel to the longitudinal axis towards the respective projection.

A length adjusting mechanism is disclosed in U.S. Pat. No. 4,622,022. Here, the mechanism includes inwardly directed projections each provided with two tapered flanks whose taper points are directed towards one another. Two such projections are provided per profiled tube. As a result of the shape of the projections, a linear contact occurs between the projections of the inner profile and those of the outer profile. This results in an increase in area pressure and a correspondingly high degree of wear.

SUMMARY OF THE INVENTION

It is an object of the invention to provide a length adjusting mechanism where the forces required for axial displacement purposes are low and which, together with their flanks, can easily be produced by non-chip forming deformation.

In accordance with the invention, if viewed in cross-section, the wall portions of the outer profile, which form the wedge, include two flank portions. The flank portions start from the first circular portions and include the flanks. A head portion connects the flank portions and extends in the form of a circular arch centered on the longitudinal axis. The wall portions of the inner profile, which form the groove, include two flank portions. The flank portions start from the second circular portions and include the flanks. A base portion connects the two flank portions and extends in the form of a circular arch centered on the longitudinal axis. An offset is dimensioned in such a way that the angle enclosed between the extended flanks of the outer profile and the extended flanks of the inner profile is increased by a differential angle of at least 12° relative to the angle which occurs if the extended flanks extended radially relative to the longitudinal axis, with the same opening width in the region of transition to the adjoining circular portions. A radial distance exists between the head face of the head portion and the base portion. Radial adjustment of the profiles resulting from a maximum permissible pitch error of the wedges and grooves of the two profiles relative to one another is smaller than the radial distance between the inner faces of the circular portions of the outer profile and the associated outer faces of the circular portions of the inner profile. This embodiment is advantageous in that the circumferential force resulting from the transmission of torque is introduced with only a small lever arm into the circular portions of the tubular profiles.

As a result of the profile shape selected, an approximately box-shaped rib is provided in the tubular profile. The rib ensures that very little deformation and only low stresses occur in the region under torque. Because of the way the flanks of the grooves and wedges extend, the profiles are self-centered under torque, whereas, centering is effected by the circular portions when the profiled tubes rotate in a load-free condition. The axial plunging forces are low. The rotational play which, with respect to the projections provided for torque transmitting purposes, is required in the case of profiled tubes movable inside one another has no effect on the contact of the flanks of the grooves and wedges of the two profiles because the differential angle ensures that self-inhibition cannot occur. The size of the angle is sufficient to ensure self-centering of the two profiles relative to one another by means of the flanks when dynamic loads occur. The substantially round contour improves the vibration behavior. The profiles feature a greater bending stiffness than prior art tubes while having the same rotational diameter. Furthermore, it is ensured that only the flanks are operative when force is transmitted; in consequence, centering is effected by the flanks only and the axial adjusting forces are low.

The differential angle preferably amounts to 14° to 30°. According to a further embodiment of the invention, the angle between the flanks of the wedge of the outer profile or between the flanks of the groove of the inner profile ranges between 25° and 120°, preferably between 60° and 100°. This makes it particularly easy to produce the wedges and grooves with pronounced flanks by a non-chipforming process.

Particularly advantageous conditions for introducing the forces in the circumferential direction are obtained if the radial flanks of each groove of the inner profile are at least partly positioned in the region of the radial dimensions of the adjoining circular portions.

In a preferred embodiment, the outer profile and the inner profile each include at least two wedges and two grooves which are symmetrically distributed around their circumferences. In this way, if the profiles form part of a driveshaft with universal joints, and each carries a universal joint at one end, the latter can be arranged relative to one another only in two circumferential positions. This ensures a phase-identical arrangement of the axes of the cross members, even if a further assembly operation takes place. Furthermore, an advantageous contour is obtained for the plug-in connection between the joint yoke of each joint and the associated profile.

To ensure an easy telescopic action, it is proposed that between the flanks of each groove and each wedge, a certain amount of play exists in the rotational direction with reference to the longitudinal axis. According to a further embodiment of the invention, the angle between the flanks of the groove in the inner profile is increased by a certain value as compared to the angle between the flanks of the wedge of the outer profile so that when the profiles are subjected to a nominal torque, a planar contact occurs between the flanks. Thus, the deformation process leads to planar contact. The angular difference ranges between 0.5° and 1°.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawings wherein.

DETAILED DESCRIPTION OF THE INVENTION

Figure 1:
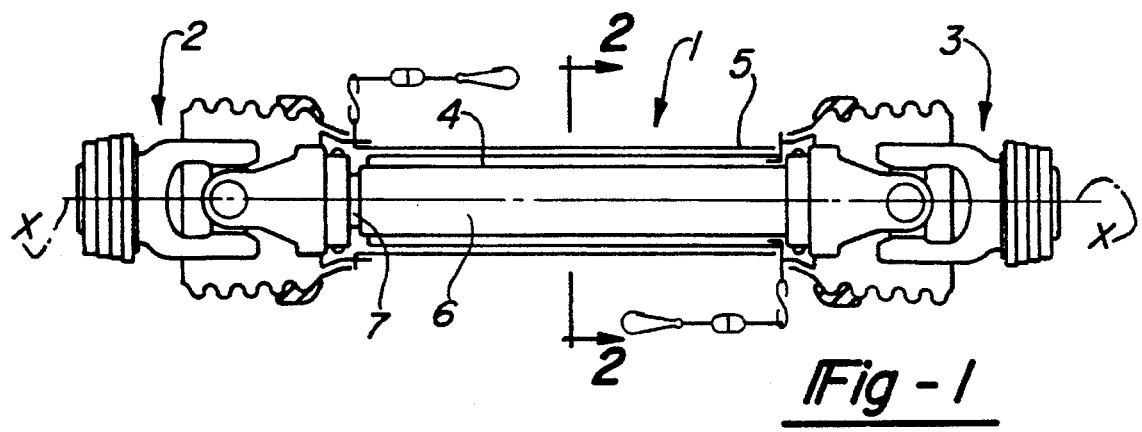
FIG. 1 is a side view of a driveshaft with two universal joints and a length adjusting assembly in accordance with the invention.

FIG. 1 shows a driveshaft 1 with two universal joints 2, 3 which are connected to one another by a length adjusting mechanism 4. For this purpose, the first universal joint 2 is connected to the inner profile 7 and the second universal joint 3 to the outer profile 6 of the length adjusting mechanism 4. The two profiles, the outer profile 6 and the inner profile 7, are slidable inside one another. A guard 5 is arranged concentrically relative to the length adjusting mechanism 4. Towards the two universal joints 2, 3, the guard 5 is provided with a funnel which at least partially covers the associated universal joints 2, 3. Also, the guard includes two protective tubes which are movable inside one another. The guard 5, by means of a chain, is connectable to a non-rotating part so that it is stationary when the two universal joints 2, 3 rotate together with the length adjusting means 4.

The driveshaft 1 serves to transmit torque. The length adjusting mechanism 4, on the one hand, transmits torque between the two universal joints and, on the other hand, compensates for changes in length which occur between the centers of articulation of the two universal joints. The length adjusting means 4 includes a tubular outer profile 6 and the tubular inner profile 7 movable along the longitudinal axis X.

Figure 2:
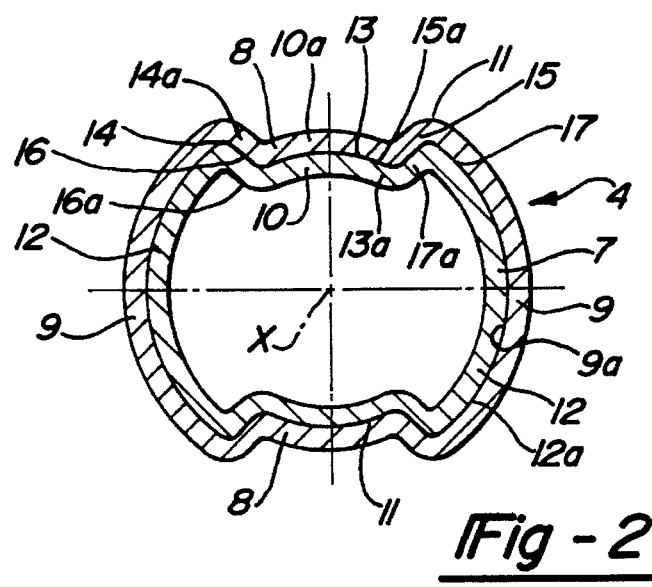
FIG. 2 is an enlarged cross sectional view of FIG. 1 along line 2—2 thereof.

As can be seen in FIG. 2, the outer profile 6, if viewed in cross-section, includes two circular portions 9 and two wedges 8. The wedges 8 are drawn in relative to the outer faces of the circular portions 9 and project inwardly beyond the inner face 9a of the circular portions 9. In this way, two wedges 8 are formed which are offset relative to one another by 180°, extend parallel to the longitudinal axis X, project inwardly and are delimited by flanks 14, 15 in the circumferential direction and by a head face 10 in the radial direction. The flanks 14, 15 form part of the flank portions 14a, 15a which form part of the tubular profile 6 and are each delimited by two adjoining circular portions 9.

The tubular inner profile 7 also includes two circular portions 12 and projections which are drawn inwardly in the direction of the longitudinal axis X, but form grooves 11. The grooves 11 are also offset relative to one another by 180° and extend parallel to the longitudinal axis X. The grooves 11 are each delimited by two flanks 16, 17 associated with the flank portions 16a, 17a and by a base portion 13a. The base portion 13a connects the two flanks and includes base face 13.

The longitudinal axis X at the same time forms the rotational axis for the two profiles 6, 7. The two wedges 8 of the outer profile 6 engage the respective grooves 11 of the inner profile 7. The two grooves 11 each include flanks 16, 17 arranged opposite the two flanks 14, 15 of the wedges 8. As a result of the contact between flanks 14, 16 or 15, 17, a torque is transmitted around the axis X if one of the two profiles 6, 7 is torque loaded. Due to the outer faces of the circular portions 12 of the inner profiles 7 contacting the inner faces 9a of the circular portions 9 of the outer profile 6, the two profiles 6, 7 are centered relative to one another with radial play. A distance exists between the head face 10 of the two wedges 8 and the base face 13 of the grooves 11. Equally, in the rotational direction, around the longitudinal axis X, a rotational play exists between the wedges 8 and the grooves 11.

Figure 3:
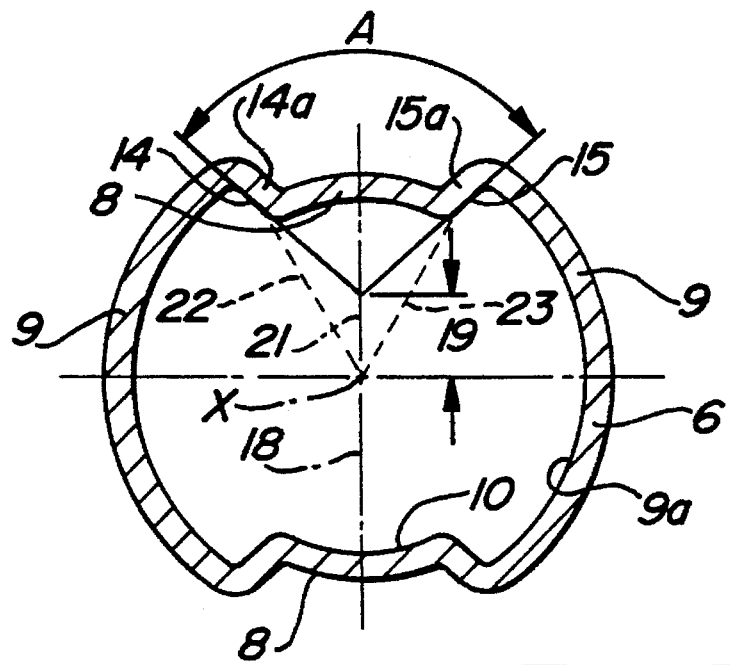
FIG. 3 is a cross section according to FIG. 2, but only through the outer profile.

FIG. 3 shows the design of the outer profile 6. The outer profile 6 includes circular portions 9 which are centered on the longitudinal axis X and which are connected to one another by the wedges 8. The wedges are in the form of drawn-in portions.

The outer profile 6 with its wedges 8 is provided by subjecting a cylindrical tube to non-chip-forming deformation. The two flanks 14, 15 of the flank portions 14a, 15a of the wedges 8 define an angle A. The imaginary extensions of the flanks 14, 15 of the wedges 8 intersect to define a central axis 18 which extends parallel to the longitudinal axis X and which is offset by an offset 19 from the longitudinal axis X towards the respective wedge 8. A central plane 21, which extends centrally between the two flanks 14, 15, intersects the central axis 18 and contains the longitudinal axis X. The offset 19 is dimensioned such that a differential angle C occurs between the angle A and an angle which would occur if the flanks extended radially with reference to the longitudinal axis X. The differential angle C would amount to approximately double the amount of the self-inhibition angle, but at least 12°, preferably 14° to 30°, assuming that the groove 11 and the wedge 8 have the same opening width in the region of transition to the circular portions 9, 12. The arms of such an angle have been given the reference numbers 22 and 23.

Figure 4:
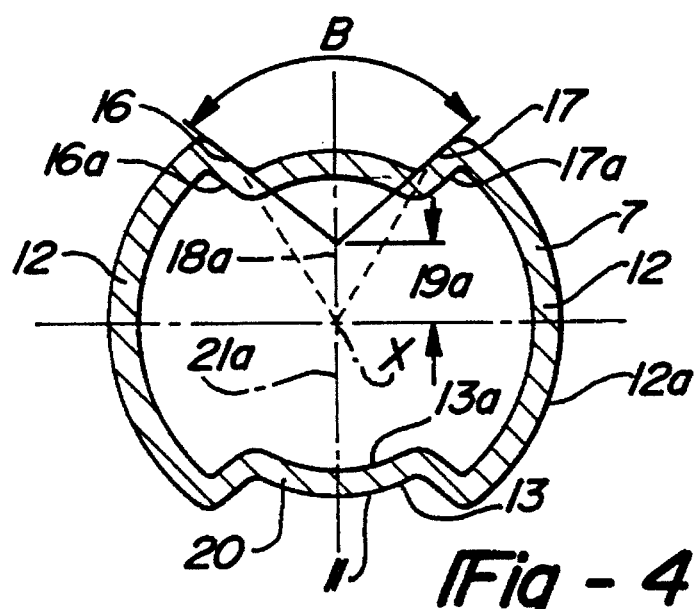
FIG. 4 is a cross section according to FIG. 2, but only through the inner profile.

In the case of the inner profile 7 as illustrated in FIG. 4, two circular portions 12 are also provided which are connected to one another by the two drawn-in portions 20 which form grooves 11 and which are offset relative to one another by 180°. The drawn-in portions 20 are delimited by the flank portions 16a, 17a and by the base portion 13a with its base face 13. Flank portions 16a, 17a are also produced by subjecting a cylindrical tube to non-chip-forming deformation. The extended flanks 16, 17 of the grooves 11, by means of an offset 19a, again intersect a central plane 21a in the central axis 18a. The central plane 21a contains the longitudinal axis X and is arranged centrally between the two flanks 16, 17 of the groove 11 of the inner profile 7.

The offset 19a is greater than the offset 19 because a circumferential play exists between the wedge 8 and groove 11. The angle B enclosed between the two flanks 16, 17 of the inner profile 7 is preferably greater than the flank angle A between the two flanks 14, 15 of the outer profile 6 as illustrated in FIG. 3. Thus, in the direction of rotation, around the longitudinal axis X, a rotational play occurs between the outer profile 6 and the inner profile 7. The two profiles, the outer profile 6 and inner profile 7, are provided in the form of tubular members made of steel. Good deformation conditions and advantageous torque transmitting conditions, when producing the outer profile 6 and the inner profile 7, are ensured if the angle A ranges between 25° and 120°, preferably between 60° and 100° and if the angle B is increased slightly relative to angle A, by approximately 0.5° to 1°.

The play values between the profiles 6, 7 inserted into one another should preferably be such that the maximum pitch error of the wedges 8 and grooves 11 is smaller than the radial play between the outer face 12a of the circular portions 12 of the inner profile 7 and the inner face 9a of the circular portion 9 of the outer profile 6. The pair of profiles 6, 7 ensures that, under torque, self-inhibition cannot occur. The profiles 6, 7 are self-centered relative to one another under torque. In the load-free condition, the profiles 6, 7 are centered relative to one another by their circular portions 9, 12.

While the above detailed description describes the preferred embodiment of the present invention, the invention is susceptible to modification, variation, and alteration without deviating from the scope and fair meaning of the subjoined claims.

We claim:

1. A length adjusting device for driveshafts, said length adjusting device comprising:

at least two tube shaped profiles inserted into one another, one of said profiles being an outerprofile and the other an inner profile which are axially movable relative to one another along their longitudinal axis and serve to transmit torque;

walls of the outer profile and of the inner profile, when viewed in cross-section, include circular portions and each provided with at least one projection which extends parallel to the longitudinal axis and which is formed by a drawn-in portion directed inwardly towards the longitudinal axis, with the projection of the outer profile forming a wedge and with the projection of the inner profile forming a groove enabling engagement with the wedge;

flanks of the wedge and groove being inclined in such a way that their imaginary extensions intersect a central plane, said central plane extends centrally between the flanks and contains the longitudinal axis, said imaginary extensions intersect said central plane at a central axis which is offset from, and in parallel to, the longitudinal axis towards the respective projection;

wall portions, when viewed in cross-section, of the outer profile which form the wedge include two flank portions starting from first circular portions and including the flanks, and a head portion which connects said flank portions and which extends in a form of a circular arch centered with respect to the longitudinal axis;

wall portions of the inner profile which form the groove including two flank portions which start from second circular portions and include the flanks, and a base portion which connects said two flank portions and extends in a form of a circular arch centered with respect to the longitudinal axis;

said central axis offset is dimensioned such that an angle enclosed between the flanks of the outer profile and the flanks of the inner profile is increased by a differential angle of at least 12° relative to the angle which occurs if the extended flanks extend radially from the longitudinal axis, with a same opening width in a region of transition to the adjoining circular portions;

a radial distance exists between a head face of the head portion and the base portion and radial adjustment of the profiles resulting from a maximum permissible pitch error of the wedges and grooves of the two profiles relative to one another is smaller than the radial distance between inner faces of the circular portions of the outer profile and the associated outer faces of the circular portions of the inner profile;

wherein an angle between said flanks of the wedge of the outer profile and an angle between the flanks of the groove of the inner profile are between 25° and 120°.

2. The length adjusting device according to claim 1, wherein the differential angle is about 14° to about 30°.

3. The length adjusting device according to claim 1, wherein the angle between the flanks of the wedge of the outer profile and the angle between the flanks of the groove of the inner profile are between 60° and 100°.

4. The length adjusting device according to claim 1, wherein the flanks of the groove of the inner profile are at least partly positioned in a region of the radial dimensions of the adjoining circular portions.

5. The length adjusting device according to claim 1, wherein the outer profile and the inner profile each include at least two wedges and two grooves which are symmetrically distributed around their circumferences.

6. The length adjusting device according to claim 1, wherein between the flanks of each groove and each wedge a predetermined amount of play exists in the rotational direction around the longitudinal axis.

7. The length adjusting device according to claim 1, wherein the angle between the flanks of the groove in the inner profile is increased by a predetermined value as compared to the angle between the flanks of the wedge of the outer profile so that when the profiles are subjected to a nominal torque, a planar contact occurs between the flanks.

* * * * *